United States Patent
Brown et al.

(10) Patent No.: US 11,182,702 B2
(45) Date of Patent: Nov. 23, 2021

(54) PRIORITIZATION OF SERVICE RESTORATION IN MICROSERVICES ARCHITECTURE

(71) Applicant: International Business Machines Corporation, Armonk, NY (US)

(72) Inventors: Kyle Gene Brown, Apex, NC (US); Brian M. O'Connell, Cary, NC (US); Jeremy R. Fox, Georgetown, TX (US); Samir Nasser, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 16/452,864

(22) Filed: Jun. 26, 2019

(65) Prior Publication Data

US 2020/0412623 A1    Dec. 31, 2020

(51) Int. Cl.
*G06Q 10/00* (2012.01)
*G06Q 10/06* (2012.01)
*H04L 12/24* (2006.01)

(52) U.S. Cl.
CPC ....... *G06Q 10/063* (2013.01); *H04L 41/5012* (2013.01); *H04L 41/5019* (2013.01); *H04L 41/5029* (2013.01); *H04L 41/5035* (2013.01)

(58) Field of Classification Search
CPC .. G06Q 10/20; G06Q 10/06; G06Q 10/06375; G06Q 10/0635; G06Q 10/067; G06Q 10/063; G06Q 10/0631; G06Q 10/0633; G06Q 10/06393; G06Q 10/0639; G06Q 50/10

See application file for complete search history.

(56) References Cited

U.S. PATENT DOCUMENTS

| | | |
|---|---|---|
| 8,321,247 B2 | 11/2012 | Trumbly et al. |
| 2002/0069102 A1 | 6/2002 | Vellante et al. |
| 2005/0055194 A1 | 3/2005 | Kraus et al. |
| 2005/0119922 A1 | 6/2005 | Eder |
| 2009/0083089 A1 | 3/2009 | Conchieri |
| 2010/0003923 A1 | 1/2010 | McKerlich et al. |
| 2010/0299437 A1* | 11/2010 | Moore ............... H04L 67/1008 709/226 |
| 2012/0284067 A1 | 11/2012 | Labat et al. |
| 2013/0013378 A1* | 1/2013 | Norris ............... G06Q 30/02 705/7.38 |

(Continued)

FOREIGN PATENT DOCUMENTS

EP    3051467 A1    8/2016

OTHER PUBLICATIONS

Pachakis, D., & Kiremidjian, A. S. (2004). Estimation of Downtime-Related Revenue Losses in Seaports following Scenario Earthquakes. Earthquake Spectra, 20(2), 427-449. (Year: 2004).*

(Continued)

*Primary Examiner* — William S Brockington, III
(74) *Attorney, Agent, or Firm* — Grant Johnson

(57) ABSTRACT

One or more microservice flows affected by a microservice failure are determined. An amount of revenue loss per period of time for the one or more microservice flows affected by the microservice failure is determined. A microservice restoration time for the microservice failure is retrieved. An expected total cost of a downtime for each microservice is determined based on the amount of revenue loss per period of time and the microservice restoration time.

20 Claims, 6 Drawing Sheets

(56) References Cited

U.S. PATENT DOCUMENTS

| | | | |
|---|---|---|---|
| 2014/0372601 | A1 | 12/2014 | Suzuki |
| 2015/0227870 | A1 | 8/2015 | Noboa |
| 2016/0092890 | A1 | 3/2016 | Bhamidipati et al. |
| 2016/0267495 | A1* | 9/2016 | Bernard ............. G06Q 30/0201 |
| 2016/0315801 | A1 | 10/2016 | Bhatia |
| 2017/0046146 | A1 | 2/2017 | Jamjoom et al. |
| 2017/0242894 | A1* | 8/2017 | Kephart ............ G06F 16/24575 |
| 2018/0270107 | A1 | 9/2018 | Nassar et al. |
| 2019/0034263 | A1 | 1/2019 | Malecki et al. |
| 2019/0102717 | A1 | 4/2019 | Wu |
| 2019/0124504 | A1* | 4/2019 | Tran .................... G06F 16/2379 |
| 2020/0110667 | A1* | 4/2020 | Al-Alem ............. G06F 11/1438 |
| 2020/0366758 | A1* | 11/2020 | Chauhan ................. H04L 41/22 |
| 2021/0011808 | A1 | 1/2021 | Al-Alem |

OTHER PUBLICATIONS

Bozhikov, A. (2012). Business downtime and its impact on business organizations. Proceedings of International Conference on Application of Information and Communication Technology and Statistics in Economy and Education (ICAICTSEE-2012), 546-552. (Year: 2012).*

"Value-stream mapping," Wikipedia, accessed Jun. 25, 2019, 5 pages. <https://en.wikipedia.org/wiki/Value-stream_mapping>.

Barcia et al., "Microservices Decision Guides," IBM Cloud Architecture Center, Feb. 20, 2017, 41 pages. <Microservices-Decision-Guides-FINAL-1.pdf>.

Brown et al., "Prioritization of Service Restoration in Microservices Architecture," U.S. Appl. No. 16/452,756, filed Jun. 26, 2019.

Cardarelli et al., "An Extensible Data-Driven Approach for Evaluating the Quality of Microservice Architectures," SAC '19, Apr. 8-12, 2019, © 2019 Association for Computing Machinery, pp. 1225-1234.

Dietrich, "The Hidden Costs of Slow Websites," DZone Performance, Jun. 18, 2017, 2 pages. <https://dzone.com/articles/the-hidden-costs-of-slow-websites>.

Fowler, "Production-Ready Microservices Building Standardized Systems Across an Engineering Organization," O'Reilly Media, Inc., Nov. 23, 2016, pp. 181-186. <http://file.allitebooks.com/20170122/Production-Ready%20Microservices.pdf>.

Gan et al., "Seer: Leveraging Big Data to Navigate the Complexity of Performance Debugging in Cloud Microservices," ASPLOS '19, Apr. 13-17, 2019, Providence, RI, USA, © 2019 Association for Computing Machinery, pp. 19-33.

Kakivaya et al., "Service Fabric: A Distributed Platform for Building Microservices in the Cloud," EuroSys '18, Apr. 23-26, 2018, Porto, Portugal, © 2018 Association for Computing Machinery, 15 pages.

Kowall, "Visualizing and tracking your microservices," AppDynamics Blog, May 12, 2015, 2 pages. <https://blog.appdynamics.com/news/visualizing-and-tracking-your-microservices/>.

Lenton, "Designing the Perfect Checkout: The Mystery of Cart Abandonment," Mobify, Feb. 7, 2017, 6 pages. <https://www.mobify.com/insights/solving-the-mystery-of-cart-abandonment/>.

List of IBM Patents or Patent Applications Treated as Related, Jun. 25, 2019, 2 pages.

Marton, "Designing a Microservices Architecture for Failure," RisingStack.com, printed May 14, 2019, 3 pages. <https://blog.risingstack.com/designing-microservices-architecture-for-failure/>.

Mell et al., "The NIST Definition of Cloud Computing," Recommendations of the National Institute of Standards and Technology, U.S. Department of Commerce, Special Publication 800-145, Sep. 2011, 7 pgs.

Solomon, "Microservices: Where Anything Is Possible," DZone Integration, Nov. 27, 2017, 4 pages. <https://dzone.com/articles/microservices-where-anything-is-possible>.

"Microservices: Potential Benefits and their Effective Design," https://softjourn.com/blog/microservices-effective-design/.

* cited by examiner

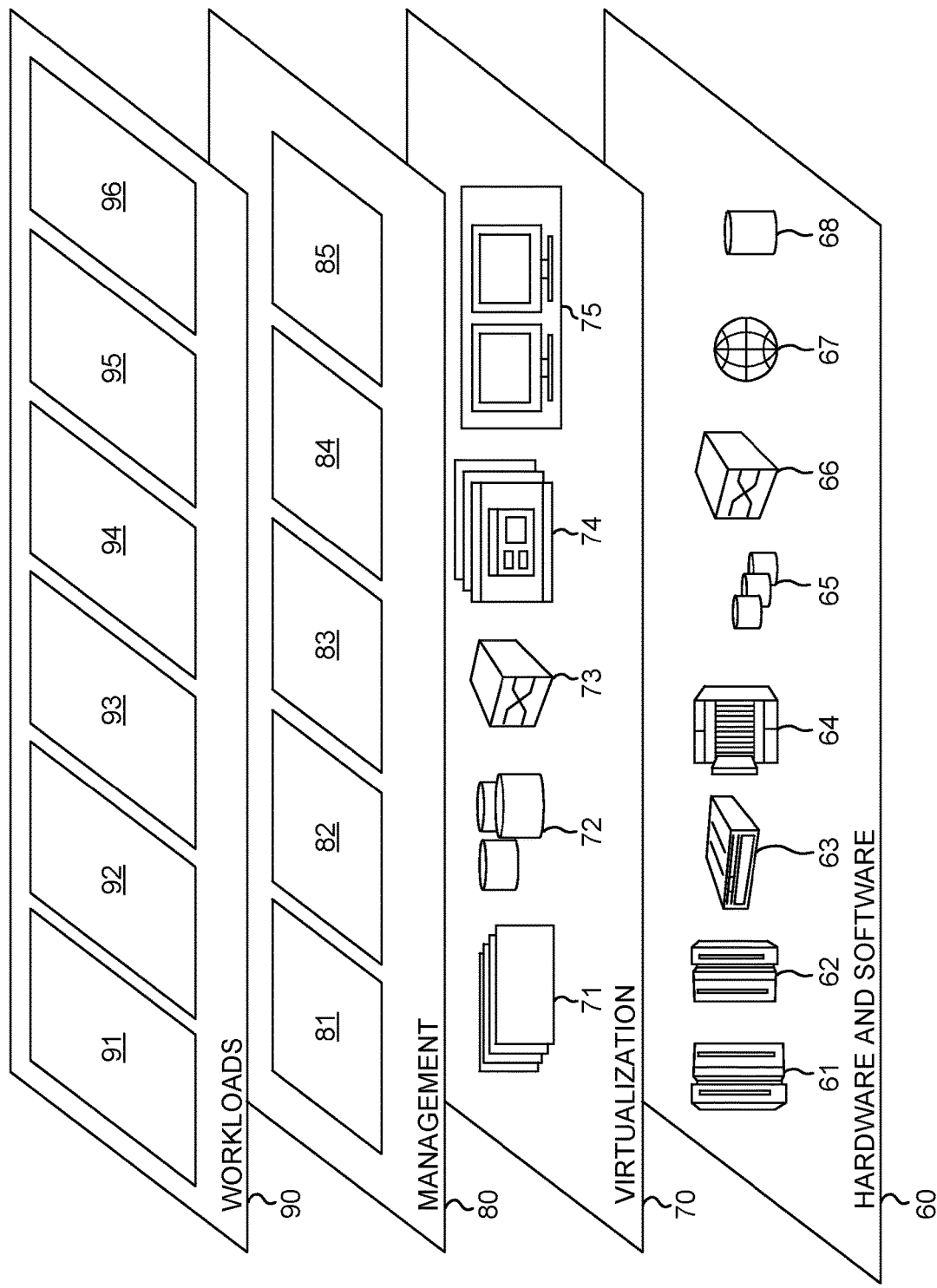

PRIORITIZATION OF SERVICE RESTORATION IN MICROSERVICES ARCHITECTURE

BACKGROUND

The present disclosure relates to microservices, and more specifically, to prioritization of service restoration in a microservices architecture. Microservices are a services-based architectural style that structures an application as a collection of loosely coupled services. In a microservices architecture, services are generally fine-grained, and protocols used are standardized and lightweight. Microservices provide a benefit of decomposing a traditional application into different smaller services or developing an application in different smaller services in the first instance, thereby improving modularity. A microservices application can be easier to understand, develop, and test. Developing in microservices can also parallelize development by enabling small autonomous teams to develop, deploy, and scale their respective services independently. This also allows the architecture of an individual service to emerge through continuous refactoring. Microservices-based architectures enable continuous delivery and deployment.

SUMMARY

Disclosed herein are embodiments of a method, system, and computer program product for microservice revenue impact determination. One or more microservice flows affected by a microservice failure are determined. An amount of revenue loss per period of time for the one or more microservice flows affected by the microservice failure is determined. A microservice restoration time for the microservice failure is retrieved. An expected total cost of a downtime for each microservice is determined based on the amount of revenue loss per period of time and the microservice restoration time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 depicts abstraction model layers according to some embodiments of the present disclosure.

Figure 1:
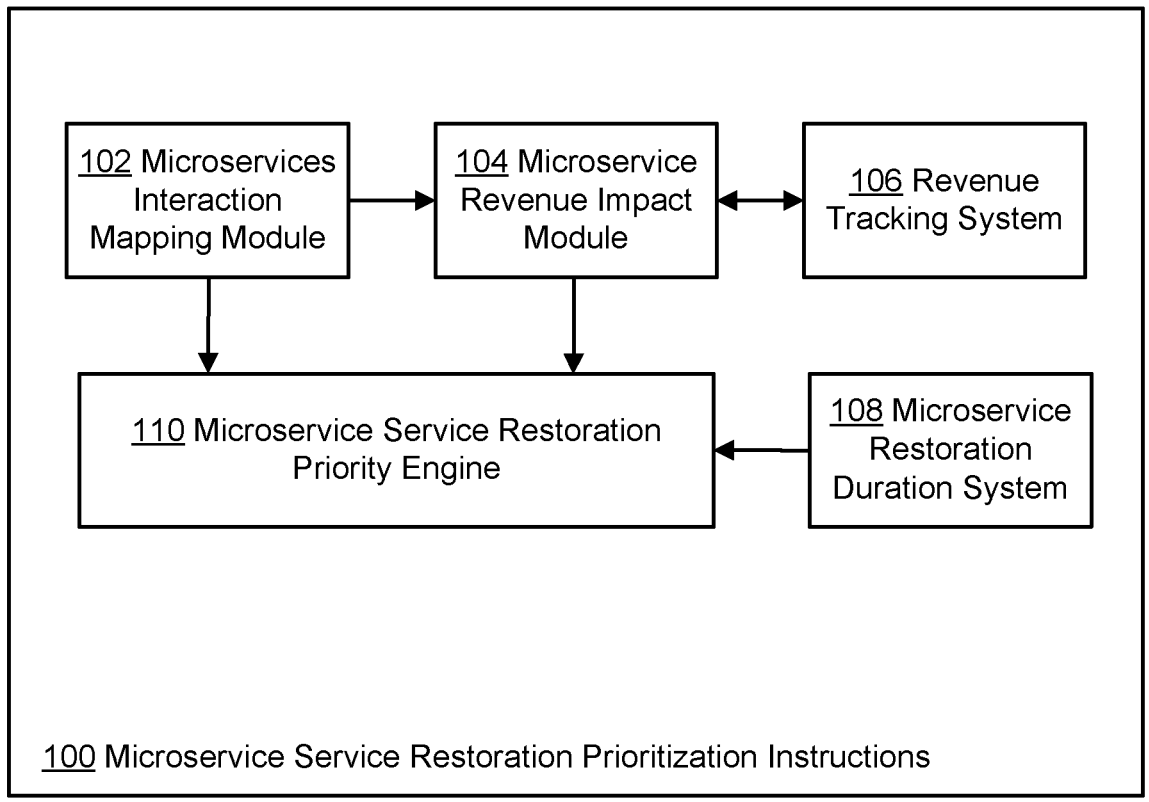
FIG. 1 depicts a block diagram of microservice service restoration prioritization instructions, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to microservices, more particular aspects relate to prioritization of service restoration in a microservices architecture based on a revenue impact calculation. While the present disclosure is not necessarily limited to such applications, various aspects of the disclosure may be appreciated through a discussion of various examples using this context.

A microservices architecture is a services-based architectural style that structures an application as a collection of loosely coupled services. Microservices are often used in cloud computing based environments and can allow for portions of a larger application to be run as microservices across one or more nodes of a cloud computing environment as resources are available. If one microservice suffers from a failure or degradation in performance, an administrator or operator can detect the failure or degradation and begin working to restore the microservice. However, if more than one microservice suffers from a failure or degradation in performance at the same time as another microservice, it may be difficult for operators to determine which service restorations have priority. This difficulty in determination can be because the fine-grained yet interconnected nature of microservices can make it difficult to understand the impacts of a down or degraded service among a plurality of services. As used herein, a failure of a microservice can include a less than complete failure, such as a degradation of performance or when the microservice is otherwise operating at less than peak efficiency.

Accordingly, a way to provide prioritization for service remediation is needed. Understanding the impact of a failure and determining remediation priorities can require looking at a plurality of factors including, e.g., the correlation of: time of day, incoming workload, historical projections, investment and/or return on revenue, mapping of orders and/or volume, or other factors as appropriate for a particular microservice. Current methods do not exist to determine a cost, such as a total revenue impact, of a failed microservice. Without such a determination or calculation, optimizations, such as prioritizing microservice restoration, based on such a cost, may not be possible.

Some embodiments of the present disclosure provide for a method, system, and computer program product for prioritization of service restoration in a microservices architecture. The method, system, or computer program product can gather, over a period of time, information about the interactions of a set of microservices and build up a set of data about the interactions. The microservices can be monitored to detect failures of the microservices. Once more than one microservice failure is detected, the method, system, or computer program product can dynamically ascertain the location of more than one failed microservice and provide a prioritization and mitigation path for fixing them. Additionally, calculation of a total revenue impact for each failed microservice can be performed. An order for microservice restoration can be prepared that is based on the determination of the overall revenue impact of each individual microservice and the total affected value stream that each failure affects. This can be performed in real time and can assist operational staff to help prioritize the restoration of the services across a microservices environment based on real time and historical workload information.

Determining an order of microservices to restore based on the revenue impact of microservice failures can provide advantages over prior methods of restoring microservices. Previously, human operators or administrators would manually perform analyses of which microservices to restore and/or restore microservices without performing a revenue impact analysis. The use of the teachings presented herein can assist an operator or administrator in restoring microservices based upon revenue impact in a manner that minimizes the impact of microservices failures on a company's revenue. These improvements and/or advantages are a non-exhaustive list of example advantages. Embodiments of the present disclosure exist which can contain none, some, or all of the aforementioned advantages and/or improvements.

Referring now to FIG. 1, depicted is a block diagram of microservice service restoration prioritization instructions 100, in accordance with embodiments of the present disclosure. Microservice service restoration prioritization instructions 100 can be an application or compilation of computer instructions for prioritizing microservice service restoration and can be used by a computer system, such as computer system 400 of FIG. 4.

Microservice service restoration prioritization instructions 100 includes microservices interaction mapping module 102, which is a module for recording interactions between deployed microservices. Microservices interaction mapping module 102 can be run before microservice failures are detected and can determine interactions between the microservices when all microservices are functioning. Interactions between microservices can be determined through analysis of network traffic or through declarative mapping. Microservices interaction mapping module 102 can record these interactions, including flows connecting multiple microservices, a data store for future analysis. In some embodiments, microservices interaction mapping module 102 can be used in detecting failures of microservices by identifying changings in microservice interactions from previous observations. Microservices interaction mapping module 102 can map microservices based on time of day the microservices are active, incoming workloads handled by microservices, input information to each microservice, output information from each microservice, and other factors as appropriate for the microservices.

Microservice service restoration prioritization instructions 100 include microservice revenue impact module 104, which is a module for determining the total revenue impact of a failed microservice. Microservice revenue impact module 104 can calculate the total cost of the impact to downstream and upstream microservices that utilize the failed microservice. The calculation can be impacted by time of day, incoming workload (which may be determined using deep packet inspection), current volume, and other methods. Information collected by microservices interaction mapping module 102 and/or revenue tracking system 106 can be used by microservice revenue impact module 104 when making determinations regarding the total revenue impact of the failed microservice.

Microservices service restoration prioritization instructions 100 include revenue tracking system 106, which is a module for tracking the overall revenue flow from the traversal of microservices. Revenue tracking system 106 can use information from the microservices interaction mapping module 102, which can include backtracking the set of service calls that were executed prior to each transaction. From that information, revenue tracking system 106 can determine which microservices were used as a part of each transaction. One possible implementation of revenue tracking system 106 is where the microservices interaction mapping module 102 generates a list of end-to-end flows from an external user interface or application programming interface (API). Upon such generation, a business user can assign an average revenue value to the entire flow. For example, a purchase flow in an online store may encompass several microservices and an average dollar value can be assigned to each purchase. Then using the frequency and time-varying nature of each purchase, the revenue tracking system 106 can calculate the value of the entire flow at any time of the day.

Microservice service restoration prioritization instructions 100 include microservice restoration duration system 108, which is a module for tracking the time it takes to restore microservices. Microservice restoration duration system 108 can track the time it takes an operator or engineer to restore a microservice from the time of failure notification or observation that a microservice has failed until full service restoration. In some embodiments, less than full service restoration can also be tracked, such as where a microservice can be restored to partial functionality in one period of time, but full restoration takes a longer, second period of time. The time(s) it takes an operator or engineer to restore a microservice can be tracked and collected for each microservice and updated each time failure and restoration occurs. Over time, an average value can be calculated for the time to restore each microservice. In some embodiments, a median or other value can be used instead of an average value (e.g., a slowest value could be used for a worst-case analysis). In some embodiments, if a historical average (or other) value does not exist for a microservice, a default value can be used, which can vary in embodiments, but may be the average time it takes to restore any microservice or can be an average time to restore a similar microservice. In some embodiments, an operator may input an estimated time to restore a microservice for microservices which the operator does not have historical data.

Microservice service restoration prioritization instructions 100 include microservice service restoration priority engine 110, which can use inputs from the other modules to prioritize microservice service restorations. Microservice service restoration priority engine 110 can track the number of current microservice outages or degradations. If more than one such failures occurs at the same time, the microservice service restoration priority engine 110 can provide an operator with an ordered list in which to restore microservice functionalities. The order can be determined using multiple factors, including the results from the microservice revenue impact module, which can be queried to determine the total revenue impact of that microservice, and the average time(s) to repair the failed microservices, as queried from microservice restoration duration system 108. Microservice service restoration priority engine 110 can use predictive methods to determine the recommended order.

For example, based on time of day, historical analysis, and deep packet inspection, the system may determine that a presently failed microservice (for instance a gift card purchase microservice in a retail application) is costing a small amount of revenue compared to another downed microservice (for instance, the gift card reload microservice in a retail application). However, the historical analysis can indicate that within a short period of time from the time of determining priority (for instance, it is 9 a.m. on the day before Mother's Day) that the gift card purchase microservice may generate more revenue than the gift card reload microservice (i.e., more customers may wish to purchase gift cards as compared to customers wishing to reload gift cards). Therefore, based on historical service restoration times, microservice service restoration priority engine 110 may recommend that the gift card purchase microservice be ranked higher for restoration than the gift card reload microservice in order to limit the impact of failed microservices on revenue.

Figure 2:
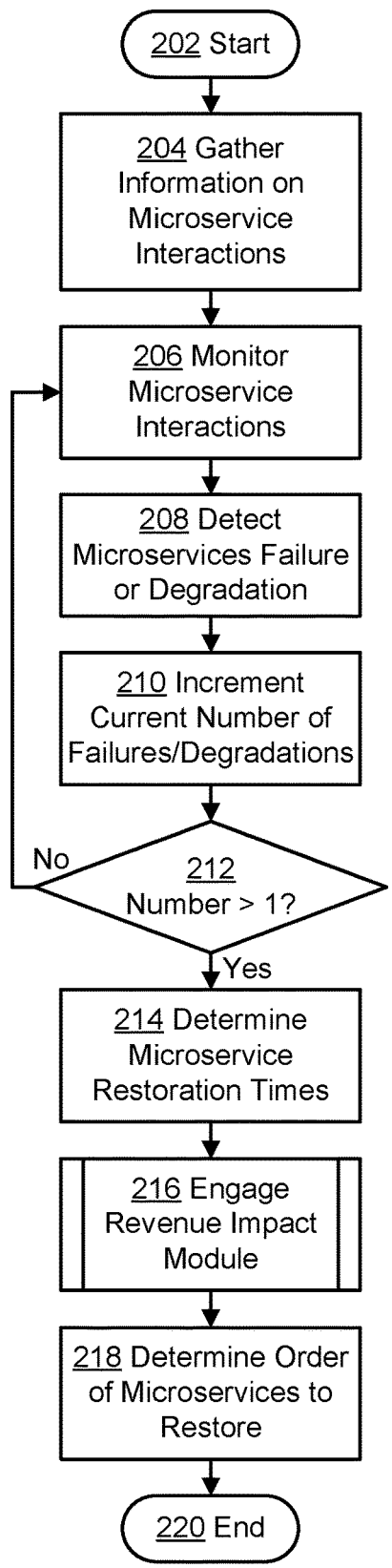
FIG. 2 depicts an example method for microservice service restoration prioritization, in accordance with embodiments of the present disclosure

Referring now to FIG. 2, depicted is an example method 200 for microservice service restoration prioritization, in accordance with embodiments of the present disclosure. Method 200 can include more or fewer operations than those depicted. Method 200 can include operations in different orders than those depicted. In some embodiments, method 200 can be performed by or performed using microservice service restoration prioritization instructions 100 of FIG. 1 and/or by a computer system (such as computer system 400 depicted in FIG. 4).

Method 200 begins at start 202. From start 202, method 200 proceeds to gather information on microservice interactions at 204. Operation 204 can be performed by a microservices interaction mapping module such as 102 of FIG. 1. Operation 204 can be performed continuously such that interactions between microservices are observed over time and information on their interactions can be updated in real time. In other embodiments, operation 204 can be performed on a periodic basis, such as when an update to one or more microservices is issued so as to gather a new baseline of microservice interactions. Gathering information on interactions between microservices can include which microservices provide input to other microservices. This can involve creating an end-to-end flow mapping of the microservices. In a simple example, this can be a flow from a first microservice A to a second microservice B to a third microservice C, without any branching between the microservices to provide inputs to multiple microservices or receive inputs from multiple microservices. In a more complicated example, the first microservice A and a fourth microservice D may both provide input to the second microservice B, which provides output to the third microservice C and a fifth microservice E. In practice, many more complicated examples of end-to-end flow mapping for microservices may be used according to the needs of the microservices architecture.

Additionally at 204, gathering information on microservice interactions can include gathering information on the time each microservice takes to perform its functions, the quantity and/or contents of inputs and/or outputs to each microservice, and any other observable information about the microservices and their interactions with one another. This information can be organized or analyzed based on various factors, including mapping the interactions by time of day, month, year, or other period, and/or comparing interactions based on whether a company is having a sale or other event which can impact usage of microservices. Additional information can be gathered on microservice interactions at 204 as appropriate to the microservices in use.

At operation 206, method 200 monitors microservice interactions. In embodiments where operation 204 is performed continuously, monitoring microservice interactions can be performed simultaneously with operation 204. Monitoring microservice interactions 206 can take the form of observing microservice interactions to detect one or more failures of microservices, which can include degradation of a microservice, such as reduced performance or increased time for a microservice to perform its function. Monitoring microservice interactions at 206 can involve analyzing one or more metrics to detect a failure (e.g., prolonged periods of poor response time, high error rates in API calls, frequent crashes, etc.). This can also involve comparing current microservice interactions with those historically observed during gathering of information on microservice interactions at 204.

Monitoring microservice interactions at 206 can continue until one or more microservice failures or degradations are detected at 208. Once one or more microservice failures or degradations are detected at 208, method 200 proceeds to operation 210 where a count of the current number of failures/degradations is incremented by one (e.g., if there is a single current failure, the count of 1 can be incremented to 2).

At operation 212, it is checked whether the current number of failures/degradations is greater than 1. If not, then priority of restoring the microservices does not need to be determined as there are not multiple failures for which to determine the order of restoration, and the single failure can be addressed. In such cases, method 200 can return to operation 206 and continue to monitor microservice interactions.

If at 212, the current number of failures/degradations is greater than 1, method 200 proceeds to operation 214 to determine microservice restoration times. Determination of microservice restoration times can involve consulting with a microservices restoration duration system (such as microservice restoration duration system 108 of FIG. 1). An average time to restore each affected microservice can be determined based on historical restoration times, or in situations where an average value does not exist, a default value or operator estimated value may be used instead. In some embodiments, more than one value can be determined including an average value to achieve partial restoration of a microservice and an average value to achieve full restoration of a microservice. In such embodiments, later steps in methods 200 and/or 300 may be performed in consideration of one or both of these average values (e.g., the order of restoration of services may include first achieving partial restoration of a first microservice, restoring a second microservice, and then achieving full restoration of the first microservice).

At 216, method 200 engages a revenue impact module, which can be a subprocess such as that described in more detail with regard to FIG. 3 below. The microservice revenue impact module engaged can be microservice revenue impact module 104 of FIG. 1 discussed above. The revenue impact module can be engaged for each microservices failure or degradation and the output of the revenue impact module can be an expected total cost of downtime for each microservice failure or degradation.

At 218, method 200 determines an order of microservices to restore. Method 200 can utilize a microservice service restoration priority engine such as 110 of FIG. 1 in performing operation 218. The order of microservices to restore can be an ordered list of a first microservice to restore, followed by a second microservice to restore, etc. This ordered list can be generated using the information collected throughout performance of method 200 and/or method 300 including the information gathered on microservice interactions, the microservice restoration times, the expected total cost of downtime for each microservice failure or degradation, as well as other inputs to a microservice service restoration priority engine. In some embodiments, determination of the order of restoration can be a multivariate analysis and/or use non-monotonic logic. In some embodiments, the order of microservices to restore can be determined by prioritizing the microservice with the largest revenue impact (i.e., greatest total cost of down time) followed by the microservice with the next largest revenue impact, etc. In such embodiments, the microservices which will be restored first are those which would cost a company the most money if left unaddressed.

In other embodiments, other factors, such as which microservice failures are most likely to cause the company the most embarrassment, may be prioritized. In other embodiments, prioritization may be given to microservices that affect an ability of a company to meet contractual deadlines or obligations, because, while these failures may otherwise have less of an impact on revenue, they could cause other reputational or legal problems for the company. In some embodiments, one or more weighted algorithms can be used to incorporate multiple of these example factors or other factors as appropriate to the microservices and/or company involved. After operation 218 is complete, method 200 ends at 220.

Figure 3:
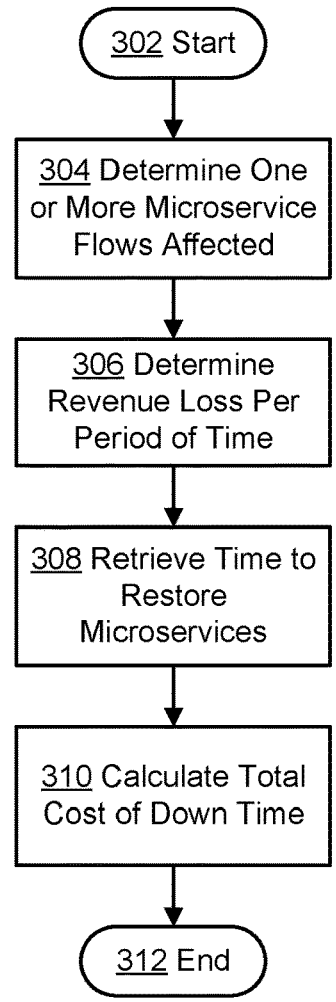
FIG. 3 depicts an example method for calculating microservice revenue impact, in accordance with embodiments of the present disclosure.

Referring now to FIG. 3, depicted is an example method 300 for calculating microservice revenue impact, in accordance with embodiments of the present disclosure. Method 300 can be a subprocess in a method for microservice service restoration prioritization, such as method 200 of FIG. 2 (e.g., the method 300 can be a subprocess of operation 216 of the method 200). Method 300 can include more or fewer operations than those depicted. Method 300 can include operations in different orders than those depicted. In some embodiments, method 300 can be performed by or performed using microservice service restoration prioritization instructions 100 of FIG. 1 and/or by a computer system (such as computer system 400 depicted in FIG. 4).

Method 300 begins at start 302. In some embodiments, start 302 may be reached after determining microservice restoration times 214 of method 200 of FIG. 2. In other embodiments, method 300 for calculating microservice revenue impact may be performed without performing method 200, such as for planning purposes including determining how important various microservices are for the operation of a company and potential revenue impacts of downtimes of these microservices.

Once method 300 has started at 302, method 300 proceeds to 304 where one or more microservice flows affected by a microservice failure is determined. Failure of an individual microservice may affect one or more flows of microservices such as the example flows discussed above with regard to operation 204 of FIG. 2 (e.g., a flow from a first microservice A to a second microservice B to a third microservice C). Using this example, a failure of any of first microservice A, second microservice B, or third microservice C would affect this flow. In other embodiments, an additional flow(s) may depend on the output from a flow involving a failed microservice. Determination of one or more microservice flows affected by a microservice failure at 304 can involve identifying all such affected flows.

At 306, method 300 determines an expected revenue loss per period of time for the affected microservice flow(s). This can be performed for each affected microservice flow. This can vary in embodiments and may depend on the types of microservice flows involved. For example, in a retail or other direct revenue-generating website, a flow of microservices may culminate in a purchase transaction. An average revenue value to the flow may be assigned by a business user, which can be utilized if a microservice involved in such a microservice flow experiences a failure, or when planning for such a failure. This may involve assigning an average dollar value to each purchase and identifying the frequency of transactions and any time-varying nature of purchases (e.g., purchases on an example website may be most common during business hours in North America and minimal during the nighttime of North American time zones). Using such an average dollar value and frequency of transactions for a given time period, an expected revenue loss for that period of time can be calculated.

In other embodiments, a microservice failure can be a degradation of the microservice, such that transactions take longer to process, and customers are less likely to complete a transaction than if the microservice were operating at peak efficiency. For example, a user experiencing difficulty during a checkout process may abandon an online shopping cart if a wait time is too high. In such embodiments, a function (seconds), which is a time varying function of a percentage of carts abandoned per second added to checkout time can be used. This function may be an equation of the form $F(n)=(N\%*n)+M\%$. In this example function, M can correspond to the base abandonment rate for transactions involving a fully functioning microservice flow (e.g., users which naturally decide not to make the purchase), N can correspond to the rate at which users abandon a cart for each additional second required to complete the transaction, and n can be the number of seconds. In other embodiments, a more complicated function can be used. The rate N and base abandonment M can be estimated or determined empirically based on previous microservice failures. In such an embodiment, revenue loss per period of time can be calculated accordingly. For example, if a website has an 80% transaction completion normally (M=20%), and the slowdown results in completion of only 50% of transactions due to a 3 second slowdown (e.g., if N=10 and n=3), this results in a loss of 30% of started transactions, which is ⅜ths of normal revenue.

In other embodiments, including non-retail applications, there may not be a direct revenue number that can easily be calculated from purchases. Instead, the impact of a microservice failure affecting one or more flows can be estimated by using the value of an application as a whole. This can be done using value streams by analyzing physical processes, identifying bottlenecks, and assigning values to each step in the process. When a flow is part of one of the steps in a value stream, the potential revenue impact of a failure can be calculated based on the value of the step in the process. One potential calculation could be made by determining the number of employees affected by a failure, identifying a loss of productivity of each employee, and determining a total loss of productivity in dollars per minute for all affected employees. For example, if a microservice failure results in employees performing a tasking manually which was previously automated, the additional time to complete such tasks can result in lower employee productivity. Similarly, as for the retail applications discussed above, in the case of a degradation instead of a complete failure, a time-varying function could be created based on diminished productivity instead of complete loss of productivity.

At 308, method 300 retrieves a time to restore microservices. This can be the microservice restoration times determined at operation 214 of method 200 of FIG. 2.

At 310, method 300 calculates the expected total cost of downtime for a microservice failure. The determination of the expected total cost of loss can be a multiplication of the average revenue loss per minute times the number of minutes of downtime, or average revenue loss per period times the number of periods of downtime, factoring in any applicable time-varying functions used in operation 306. After operation 310, method 300 ends at 312.

Figure 4:
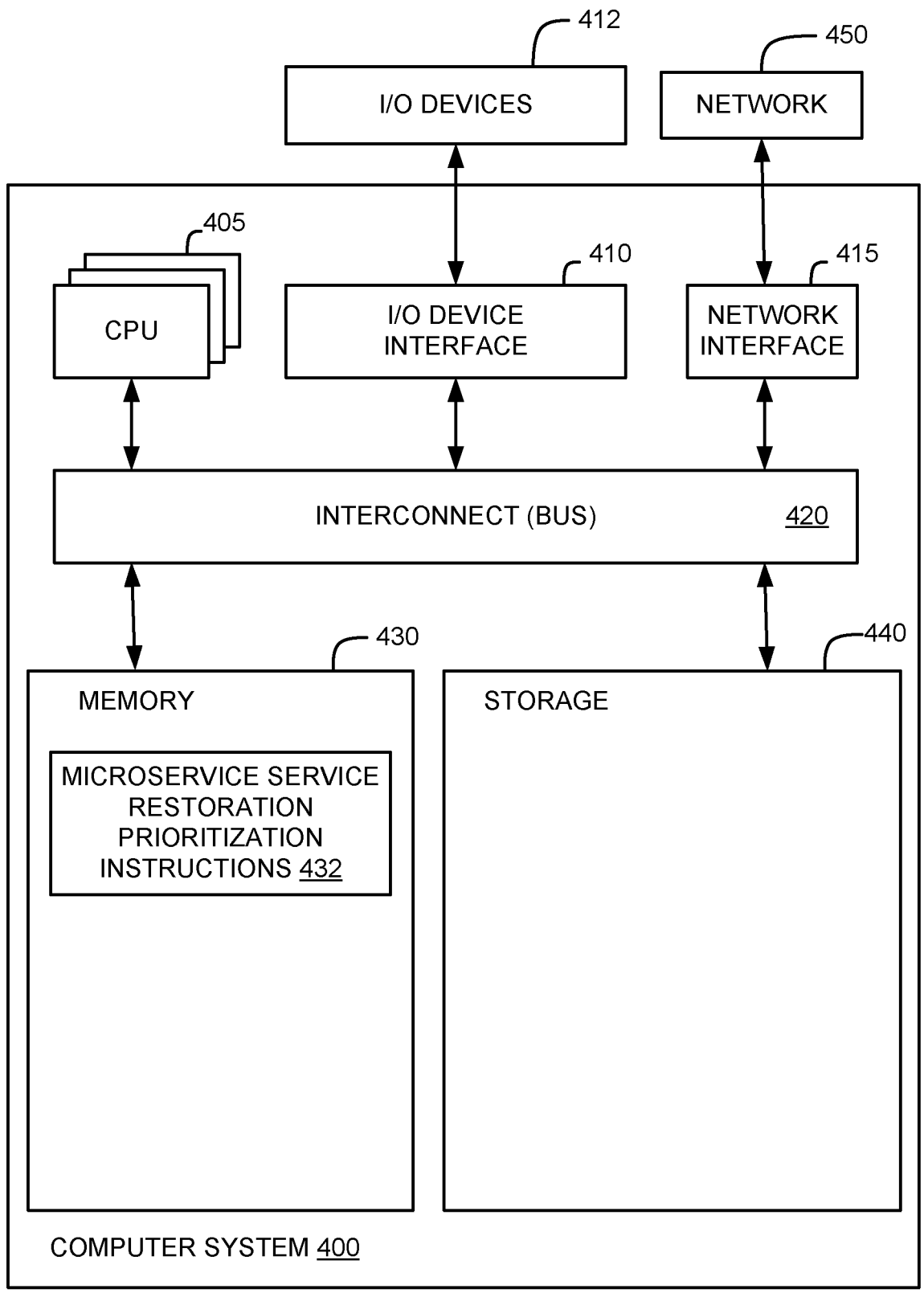
FIG. 4 illustrates a block diagram of a computer system, in accordance with some embodiments of the present disclosure.

Referring now to FIG. 4, illustrated is a block diagram of a computer system 400, in accordance with some embodiments of the present disclosure. In some embodiments, computer system 400 performs operations in accordance with method 200 of FIG. 2 and/or method 300 of FIG. 3 as described above. The computer system 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash).

In some embodiments, the memory 430 can be in the form of modules (e.g., dual in-line memory modules). The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the computer system 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of computer system 400 includes microservice service restoration prioritization instructions 432. Microservice service restoration prioritization instructions 432 can be an application or compilation of computer instructions for prioritizing microservices service restoration using computer system 400. Microservice service restoration prioritization instructions 432 can be consistent with Microservice service restoration prioritization instructions 100 of FIG. 1 and can contain a microservices interaction mapping module, microservice revenue impact module, revenue tracking system, microservice restoration duration system, and microservice service restoration priority engine, each consistent with their like-named portions of FIG. 1 discussed above.

In some embodiments as discussed above, the memory 430 stores microservice service restoration prioritization instructions 432. However, in various embodiments, microservice service restoration prioritization instructions 432 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from a user and present information to a user and/or a device interacting with computer system 400.

The network 450 can connect (via a physical or wireless connection) the computer system 400 with other networks, and/or one or more devices that interact with the computer system.

Logic modules throughout the computer system 400— including but not limited to the memory 430, the CPUs 405, and the I/O device interface 410—can communicate failures and changes to one or more components to a hypervisor or operating system (not depicted). The hypervisor or the operating system can allocate the various resources available in the computer system 400 and track the location of data in memory 430 and of processes assigned to various CPUs 405. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
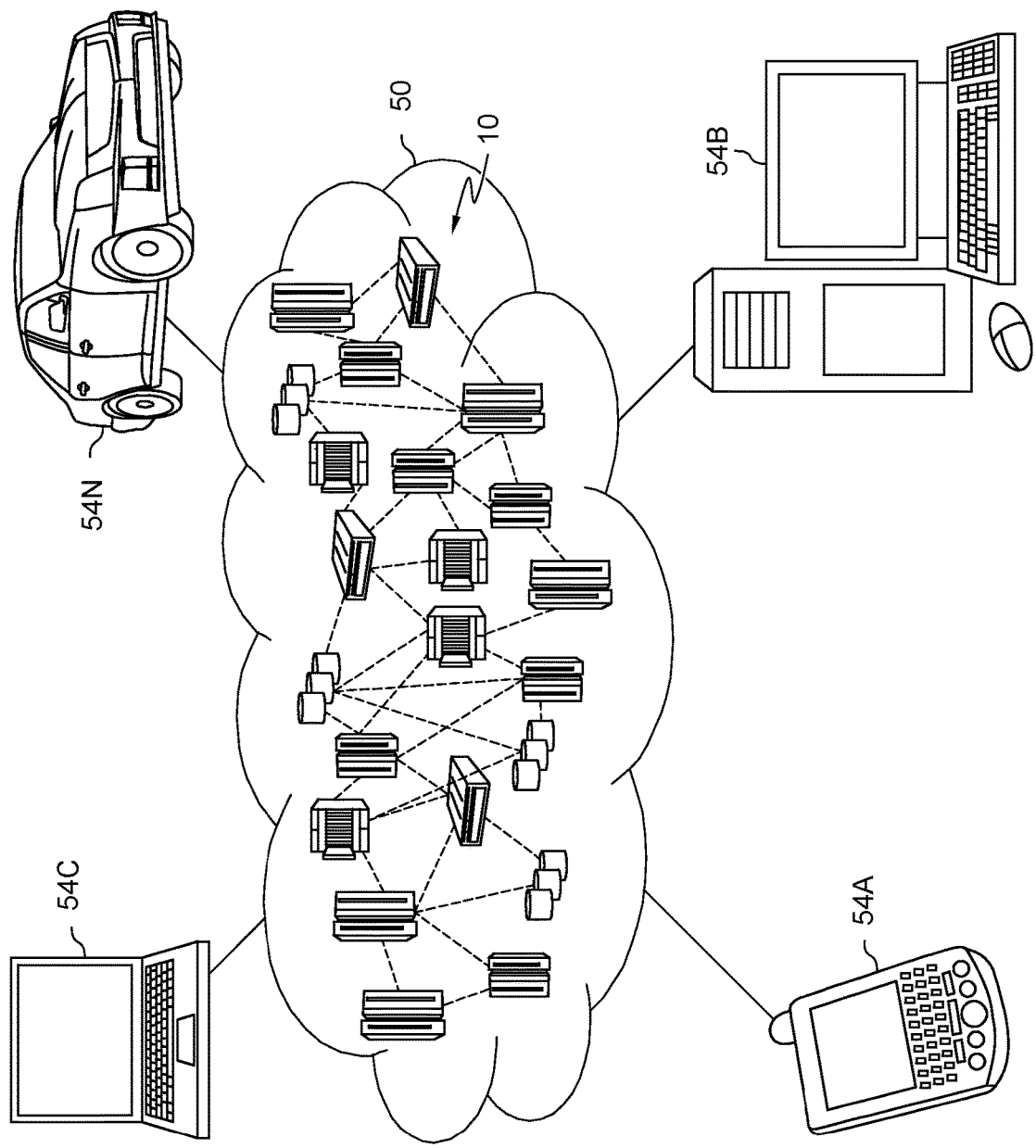
FIG. 5 depicts a cloud computing environment according to some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice service restoration prioritization 96. Microservice service restoration prioritization 96 can be a workload or function such as that described in FIG. 1 above and/or can perform one or more of methods 200 of FIGS. 2 and 300 of FIG. 3.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A method for managing cloud infrastructure comprising:
    recording network traffic between a plurality of deployed microservices, wherein the plurality of deployed microservices comprise a collection of loosely coupled services that cooperate to form a plurality of microservice flows for one or more software applications;
    automatically, by a microservices interaction mapping module:
    analyzing the network traffic to generate an end-to-end flow mapping of the plurality of deployed microservices;
    continuously analyzing the network traffic and the end-to-end flow mapping to dynamically detect changes in interactions between the plurality of deployed microservices; and
    detecting a plurality of failures of the plurality of deployed microservices using the dynamically detected changes in interactions;
    using the end-to-end flow mapping to determine which of the plurality of microservice flows are affected by each of the plurality of failures;
    determining an amount of revenue loss per period of time for each affected microservice flow;
    retrieving, for the each of the plurality of failures, a microservice restoration time;
    determining an expected total cost of down time for each affected microservice flow based on the determined amount of revenue loss per period of time for each affected microservice flow and the retrieved microservice restoration time; and
    generating a prioritized order for microservice restoration using the expected total cost of down time for each affected microservice flow.

2. The method of claim 1, wherein the plurality of microservice flows affected by at least one of the plurality of failures perform one or more functions for a retail website.

3. The method of claim 2, wherein determining the amount of revenue loss per period of time comprises:
    determining an average revenue value per transaction performed by the one or more functions for the retail website; and
    determining a frequency of transactions performed by the one or more functions for the retail website.

4. The method of claim 2, wherein determining the amount of revenue loss per period of time comprises:
    determining a rate of transaction abandonment per additional second required to complete a transaction due to each of the plurality of failures.

5. The method of claim 4, wherein determining the amount of revenue loss per period of time further comprises:
    determining a number of additional seconds required to complete the transaction due to each of the plurality of failures.

6. The method of claim 1, wherein the network traffic comprises a time of day each of the plurality of deployed microservices is active, incoming workloads handled by each of the plurality of deployed microservices, and output information from each of the plurality of deployed microservices; and wherein determining the amount of revenue loss per period of time for each affected microservice flow comprises:
    performing, by the plurality of deployed microservices, a transaction for the application;
    backtracking a set of service calls to identify which microservices of the plurality of deployed microservices were used in the transaction;
    using the identified microservices to determine a number of employees affected by the microservices used in the transaction.

7. The method of claim 6, wherein determining the amount of revenue loss per period of time for each affected microservice further comprises calculating a loss of productivity value for each of the employees affected by the microservices used in the transaction.

8. A system for managing cloud infrastructure, the system comprising:
    one or more processors; and
    a memory communicatively coupled to the one or more processors, wherein the memory comprises instructions which, when executed by the one or more processors, cause the one or more processors to perform a method comprising:
    recording network traffic between a plurality of deployed microservices, wherein the plurality of deployed microservices comprise a collection of loosely coupled services that cooperate to form a plurality of microservice flows for one or more software applications;
    automatically, by a microservices interaction mapping module:
    analyzing the network traffic to generate an end-to-end flow mapping of the plurality of deployed microservices;
    continuously analyzing the network traffic and the end-to-end flow mapping to dynamically detect changes in interactions between the plurality of deployed microservices; and
    detecting a plurality of failures of the plurality of deployed microservices using the dynamically detected changes in interactions;

using the end-to-end flow mapping to determine which of the plurality of microservice flows are affected by each of the plurality of failures;
determining an amount of revenue loss per period of time for each affected microservice flow;
retrieving, for each of the plurality of failures, a microservice restoration time;
determining an expected total cost of down time for each affected microservice flow based on the determined amount of revenue loss per period of time for each affected microservice flow and the retrieved microservice restoration time; and
generating a prioritized order for microservice restoration using the expected total cost of down time for each affected microservice flow.

9. The system of claim 8, wherein the plurality of microservice flows affected by at least one of the plurality of failures perform one or more functions for a retail website.

10. The system of claim 9, wherein determining the amount of revenue loss per period of time comprises:
determining an average revenue value per transaction performed by the one or more functions for the retail website; and
determining a frequency of transactions performed by the one or more functions for the retail website.

11. The system of claim 9, wherein determining the amount of revenue loss per period of time comprises:
determining a rate of transaction abandonment per additional second required to complete a transaction due to each of the plurality of failures.

12. The system of claim 11, wherein determining the amount of revenue loss per period of time further comprises:
determining a number of additional seconds required to complete the transaction due to each of the plurality of failures.

13. The system of claim 8, wherein the network traffic comprises a time of day each of the plurality of deployed microservices is active, incoming workloads handled by each of the plurality of deployed microservices, and output information from each of the plurality of deployed microservices; and wherein determining the amount of revenue loss per period of time for each affected microservice flow comprises:
performing, by the plurality of deployed microservices, a transaction for the application;
backtracking a set of service calls to identify which microservices of the plurality of deployed microservices were used in the transaction;
using the identified microservices to determine a number of employees affected by the microservices used in the transaction.

14. The system of claim 13, wherein determining the amount of revenue loss per period of time each affected microservice flow further comprises calculating a loss of productivity value for each of the employees affected by the microservices used in the transaction.

15. A computer program product for managing cloud infrastructure, the computer program product comprising a computer readable storage medium having program instructions embodied therewith, wherein the computer readable storage medium is not a transitory signal per se, the program instructions executable by a computer to perform a method comprising:
recording network traffic between a plurality of deployed microservices, wherein the plurality of deployed microservices comprise a collection of loosely coupled services that cooperate to form a plurality of microservice flows for one or more software applications;
automatically, by a microservices interaction mapping module:
analyzing the network traffic to generate an end-to-end flow mapping of the plurality of deployed microservices;
continuously analyzing the network traffic and the end-to-end flow mapping to dynamically detect changes in interactions between the plurality of deployed microservices; and
detecting a plurality of failures of the plurality of deployed microservices using the dynamically detected changes in interactions;
using the end-to-end flow mapping to determine which of the plurality of microservice flows are affected by each of the plurality of failures;
determining an amount of revenue loss per period of time for each affected microservice flow;
retrieving, for each of the plurality of failures, a microservice restoration time;
determining an expected total cost of down time for each affected microservice flow based on the determined amount of revenue loss per period of time for each affected microservice flow and the retrieved microservice restoration time; and
generating a prioritized order for microservice restoration using the expected total cost of down time for each affected microservice flow.

16. The computer program product of claim 15, wherein the plurality of microservice flows affected by at least one of the plurality of failures perform one or more functions for a retail website.

17. The computer program product of claim 16, wherein determining the amount of revenue loss per period of time comprises:
determining an average revenue value per transaction performed by the one or more functions for the retail website; and
determining a frequency of transactions performed by the one or more functions for the retail website.

18. The computer program product of claim 17, wherein determining the amount of revenue loss per period of time comprises:
determining a rate of transaction abandonment per additional second required to complete a transaction due to each of the plurality of failures.

19. The computer program product of claim 18, wherein determining the amount of revenue loss per period of time further comprises:
determining a number of additional seconds required to complete the transaction due to each of the plurality of failures.

20. The computer program product of claim 15, wherein the network traffic comprises a time of day each of the plurality of deployed microservices is active, incoming workloads handled by each of the plurality of deployed microservices, and output information from each of the plurality of deployed microservices; and wherein determining the amount of revenue loss per period of time for each affected microservice flow comprises:
performing, by the plurality of deployed microservices, a transaction for the application;
backtracking a set of service calls to identify which microservices of the plurality of deployed microservices were used in the transaction;

using the identified microservices to determine a number of employees affected by the microservices used in the transaction.

* * * * *